Jan. 15, 1929.
A. R. HUETTIG
1,699,145
GAS METER
Filed Feb. 28, 1924    2 Sheets-Sheet 1
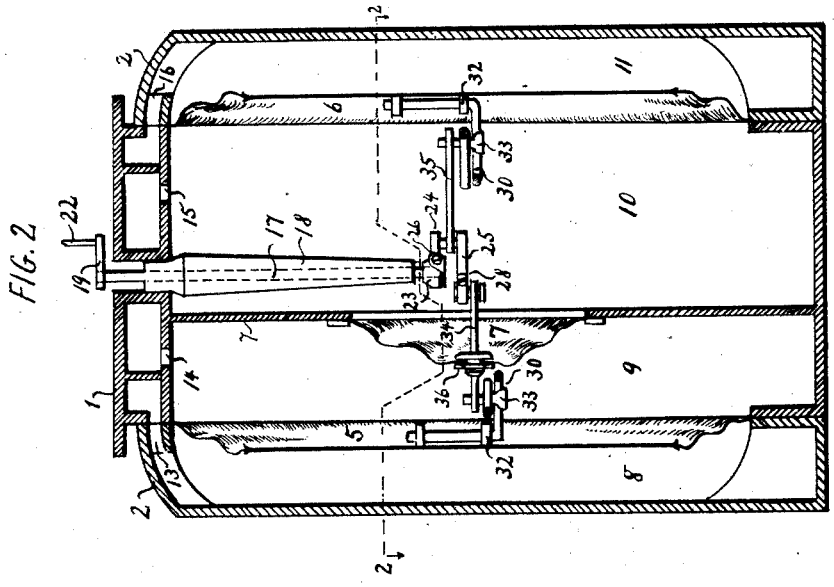
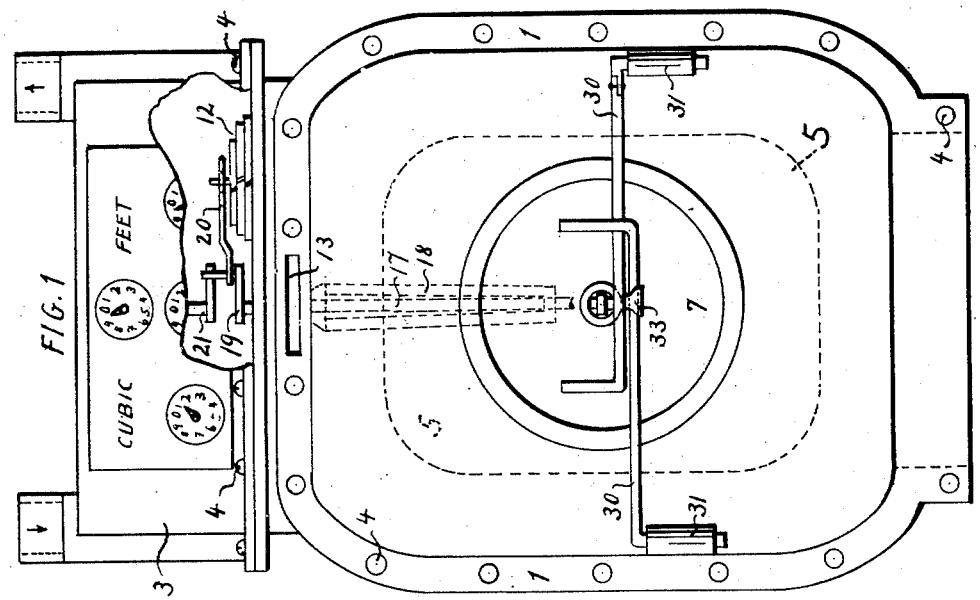
INVENTOR
Arno R Huettig Jan. 15, 1929.                A. R. HUETTIG                1,699,145
                                GAS METER
                           Filed Feb. 28, 1924           2 Sheets-Sheet 2
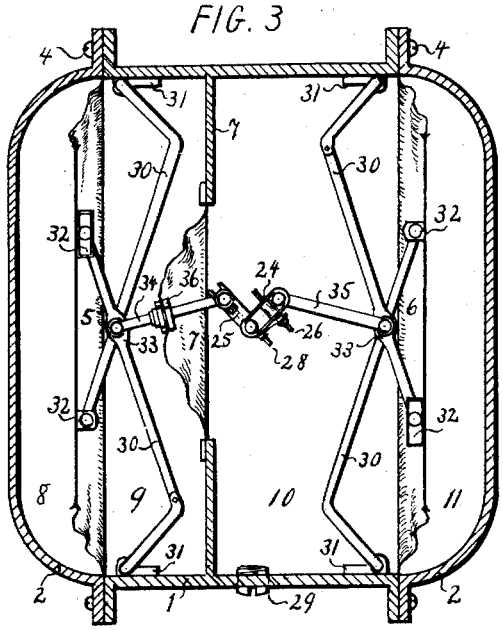
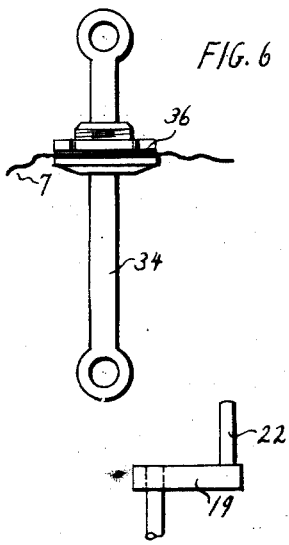
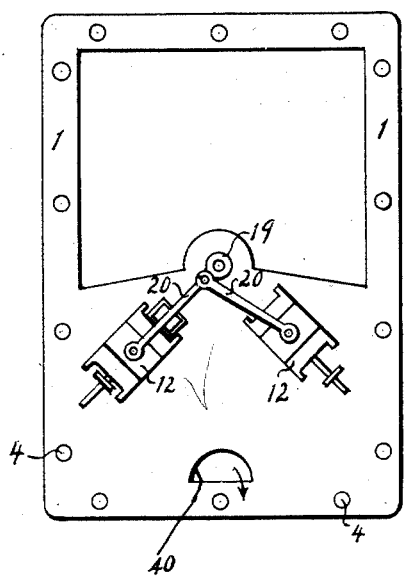
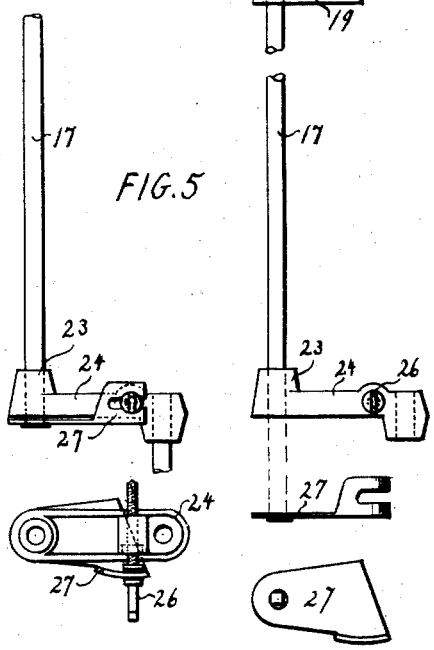
INVENTOR
Arno R Huettig Patented Jan. 15, 1929.

1,699,145

UNITED STATES PATENT OFFICE.

ARNO R. HUETTIG, OF STRATFORD, CONNECTICUT, ASSIGNOR TO AMERICAN METER COMPANY, INCORPORATED, OF NEW YORK, N. Y., A CORPORATION OF DELAWARE.

GAS METER.

Application filed February 28, 1924. Serial No. 695,725.

My invention relates to improvements in gas meters in which, by the aid of one central partition and two diaphragms, four measuring chambers are formed, and where the vibrations of the diaphragms are transmitted into the valve chamber by means of a shaft.

Among the objects of my invention are, first, to produce a gas meter of the type which includes a diaphragm receiving portion consisting of a central case and two concave covers therefor, and an overlying cap or valve enclosing portion. This whole receptacle is usually made out of cast iron, or other suitable metal, to give the enclosed mechanism adequate protection. Secondly, by dividing the diaphragm receiving or measuring apartment into four chambers, by means of two flexible diaphragms and between them a suitable, partly or entirely flexible or pliable partition of light weight material occupying relatively little space, I reduce the weight and size of the meter considerably without in the least reducing the capacity of the meter. Thirdly, I utilize only one shaft and consequently one opening through the top wall of the casing (or stuffing box as commonly called) to convey the power generated by the diaphragm movement up to the valve chamber, thus, as compared to some meter constructions, reducing the number of or eliminating short shafts and short bearings, and so reducing friction and prolonging life of the mechanism. Furthermore, by employing a diaphragm carrier consisting of a pair of brackets pivotally secured to each other between their ends, notwithstanding its simplicity, I afford effective support and guidance for the diaphragm and do away with the necessity for additional guides journaled in the condensation boxes. This type of carrier produces a shorter stroke and increased force at the junction of its brackets than the diaphragm itself performs, or in other words, the extent of movement of the diaphragm may be increased without increasing the radius of throw of the shaft actuating crank arm. Another object has been to provide for the easy and accurate adjustment of the diaphragm stroke as well as of the angular relation between the cranks carried by the power transmitting shaft to secure correct measuring and a smooth flow of gas.

One form of apparatus embodying my invention is illustrated in the accompanying drawings, in which Figure 1 is a front elevation with one cover and one diaphragm removed, Figure 2, a central vertical section, Figure 3, a horizontal section on the line 2—2 of Figure 2 showing particularly the carriers or diaphragms supporting brackets and connecting links, Figure 4, a plan view of the meter with the cap removed, showing the valve actuating crank, the valves and the outlet port, Figure 5, enlarged detailed views of the mechanism for relative angular adjustment of the cranks, and Figure 6, an enlarged view of the connecting link with flange and nut.

Referring to the drawings, the central case 1 is provided with removable concave covers 2 and the top cap 3 secured in operative position by screws 4. Two diaphragms 5 and 6 are held in position by clamping them between the covers 2 and the case 1 and, in conjunction with the flexible partition 7 divide the main cavity into four measuring chambers 8, 9, 10, and 11. The cap 3 encloses the valves 12 which regulate the flow of gas into the measuring chambers by way of the ports 13, 14, 15, and 16, and its discharge through an outlet port 40. In the center of the case 1 is vertically located the crank shaft 17, journaled in the support 18. The shaft 17 is supported by and leads through an air-tight passage or stuffing box into the valve chamber and is provided with a crank 19 to operate the valves 12 by means of the links 20 and at the same time actuates the registering movement or indicator means 21 by means of a pin 22 secured to said crank 19.

The lower end of the shaft 17 fits tightly as by friction in the eye 23 of the bell crank having arms 24 and 25, Figure 2, yet it is turnable and is held in the proper position by the screw rod 26 having an annular groove engaging a slot in the plate 27, the latter being rigidly fastened to the shaft 17. Thus, by slacking or tightening said screw rod the angular relation between the valve actuating crank 19 and said shaft actuating bell crank can be established or adjusted. The connecting pin of crank arm 25 is in the usual manner slidably adjustable in a terminal slot provided in said crank arm, its position therein being secured by the screw rod 28, thus affording effective means for increasing or decreasing the stroke of crank arm 25 and simultaneously the displacement of the diaphragm 5, which is connected with crank arm 25 through a link 34. An inlet opening through the wall of the case and which is normally closed as by a plug 29, permits the insertion of a tool to turn the screw rods 26 and 28 without taking the meter apart.

To support the diaphragm, I provide in each of the measuring chambers 9 and 10 a carrier consisting of two horizontally disposed brackets 30 hinged on opposite sides to the meter case at 31 and with their respective swinging ends connected to the diaphragms at 32, 32. The shearing or pivotal points of each pair of brackets are developed into pivot couplings 33 which are connected to the cranks 24 and 25 by the links 34 and 35 within the chamber 10.

The link 34 is provided with a flange and nut 36 to secure the link 34 to the flexible or pliable partition 7 and close the hole in the latter by clamping the flexible material between said nut and flange, thus rendering this partition between chambers 9 and 10 gas-tight, and yet permitting the movements of diaphragm 5 to be transmitted to crank arm 25 by means of link 34 which carries the elastic or flexible membrane along with it while traveling to and fro.

As indicated, both the crank arms 24 and 25 are positioned between the central partition and the diaphragm 6 and the connections between said arms and their respective diaphragm connecting links is made in the chamber 10.

From the foregoing description of one embodiment of my invention it will be apparent that my improved construction provides a meter in which maximum measuring capacity is coupled with material economy of space. Furthermore, the capacity may be varied over a wide range by varying the stroke or extent of travel of the diaphragms and the meter may be adjusted to register accurately under all conditions of flow by adjusting the angular relation between the cranks on the vertical shaft 17. Where the construction involves carrying a link connection through a partition wall in the casing, the partition is rendered gas tight at the point of passage by the means described or its equivalent with practically no loss of power and without diminishing the accuracy of measurement.

I claim as my invention:

1. A meter comprising valve mechanism and actuating means therefor, including a crank shaft, a crank at each end thereof, one of said cranks being movably secured to said shaft, a separate arm rigidly secured to said shaft, and means interposed between said separate arm and said movable crank for effecting relative movement of rotation between the shaft and said movable crank.

2. In a meter the combination of valve mechanism and actuating means therefor including a crank shaft, a crank at each end thereof, one of said cranks being movably secured to said shaft, a separate arm rigidly secured to said shaft, means interposed between said separate arm and said movable crank for effecting relative movement of rotation between the shaft and said movable crank, and means for retaining said shaft and said movable crank in any desired operative position with respect to each other.

3. In a meter, the combination of the partition 7 having a flexible portion, a diaphragm 5, a diaphragm 6, a crank shaft 17, crank arms 24 and 25 operatively connected to said crank shaft, a link 35 connecting diaphragm 6 with crank arm 24 and a link 34 extending through said flexible portion of the partition and operatively connecting diaphragm 5 with crank arm 25.

ARNO R. HUETTIG.